United States Patent [19]

Sakurai

[11] Patent Number: 5,210,734
[45] Date of Patent: May 11, 1993

[54] INFORMATION MANAGEMENT METHOD FOR APPENDAGE TYPE ADDITIONAL INFORMATION RECORDING MEDIUM

[75] Inventor: Yukimitsu Sakurai, Yokohama, Japan

[73] Assignee: Victor Company of Japan, Ltd., Yokohama, Japan

[21] Appl. No.: 574,154

[22] Filed: Aug. 29, 1990

[30] Foreign Application Priority Data

Aug. 30, 1989 [JP] Japan .................................. 1-223472

[51] Int. Cl.$^5$ .............................................. G11B 7/00
[52] U.S. Cl. .......................................... 369/49; 369/32
[58] Field of Search .................. 360/48; 369/59, 32, 369/111, 48, 49, 124

[56] References Cited

U.S. PATENT DOCUMENTS 4,789,979  12/1988  Hiraoka et al. .................. 369/32
4,827,462   5/1989  Flannagan et al. ............... 369/32

Primary Examiner—Donald E. McElheny, Jr.
Attorney, Agent, or Firm—Jacobson, Price, Holman & Stern

[57] ABSTRACT

A method for recording information intermittently on a write-once recording medium, comprising the steps of; providing on the recording medium a volume management area and a data area, recording an information and a management information for managing the information recorded, to the data area and the volume management area respectively, adding another information to the data area, renewing the management information for managing the information previously recorded and the information added as a whole and adding the renewed management information to the volume management area, and filling a non-recorded area between the last position of the management information added lastly and the start position of the data area with dummy data for making all of the recorded area contiguous.

1 Claim, 3 Drawing Sheets

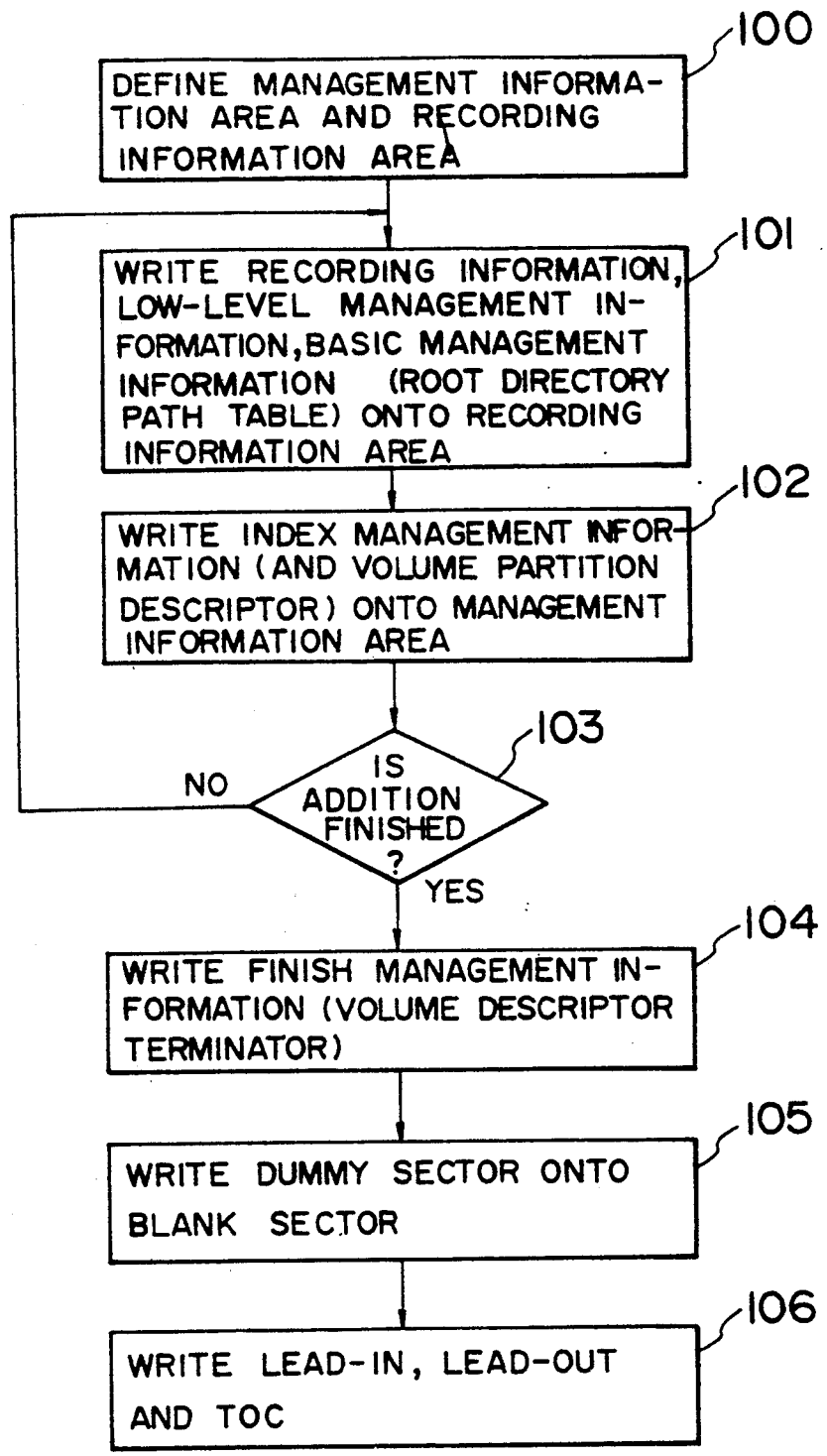
F I G. 1

INFORMATION MANAGEMENT METHOD FOR APPENDAGE TYPE ADDITIONAL INFORMATION RECORDING MEDIUM

BACKGROUND OF THE INVENTION

1. Field of the Invention

The present invention relates to a write-once recording medium (optical disk) and an information management method thereof. More particularly, the invention relates to the optical disk which has a logical format designed in a manner to reproduce information from the optical disk in a reproducing drive for a read-only optical disk (for example, CD-ROM).

2. Description of the Prior Art

A compact disk (CD) developed as a digital audio disk has a capacity to record as much data as 500 to 600 M bytes though it has a diameter of 12 cm. With the capability to record such a large quantity of data, like a magnetic disk (for example, floppy disk or harddisk), the optical disk has been used as a read-only information recording medium. The CD used as an information recording medium is referred to as CD-ROM, which are commercially available as a medium recording dictionaries or maps.

The CD-ROM has a physical property and format standardized in a CD standard manual (red book) and CD-ROM standard manual (yellow book) published by Philips Company. The physical property and format include a physical structure of the disk itself, an optical property, a signal processing system, an error correcting system, a sector number, a sector capacitance, and the like. This is de facto standard.

And, recently, a logical format (for example, management of directory files) located between the physical format and an application layer has been standardized as ISO 9660. The standardization of the logical format results in keeping commercially-available CD-ROMs compatible with each other. It is supposed that the CD-ROMs rapidly pervade as a recording medium more and more of our society.

Not only the read-only CD-ROMs but also writable optical disks have been widely developed. The writable optical disks include write-once optical disks and rewritable disks. For the former disks, information can be written once and for the latter ones, information can be written and erased many times.

The rewritable optical (magnetic) disks employ opto-magnetic effect or phase transition. Hence, they have a different physical property from that of the CDs or CD-ROMs, thereby being unable to keep both the former rewritable disks and the latter CDs and CD-ROMs compatible with each other at the current stage.

On the other hand, the write-once optical disk can manage to have a physical property to be compatible with a music CD or CD-ROM if it selectively uses a proper material because no consideration is required for erasing and rewriting. It means that if the write-once optical disk is designed to have the same physical and logical formats as the music CDs and CD-ROMs, they can be reproduced in a CD-ROM player.

As an example, the method of using a write-once disk as a music CD can be referred. This method comprises the steps of selecting some pieces of music from music data being stocked in a store as required, generating a table of contents (TOC) required for managing these pieces of music, and recording the TOC and the music data on the write-once optical disk for producing an original music CD.

As stated above, since the CD-ROM has a capacity of recording a large quantity of information, it has to manage a lot of files efficiently. For this purpose, it employs a file hierarchy structure, that is, a so-called directory hierarchy structure as well as a volume structure for managing several CD-ROMs systematically.

When all of files should be stored, in which contain information or data, are written in the write-once disk at a time, it is possible to generate hierachial directories and/or managing information for managing them in the same manner as for CD-ROM and to write in simultaneously with the files.

In this case it is possible to grasp all the file information and the directory information, to create the optimum management information in a large host computer, and to write the information based on a logical format being compatible with that of the CD-ROM. Thus, the write-once disk so written may be used interchangeably with the CD-ROM.

On the other hand, when the writing operation is carried out intermittently for adding a file or files to the previously written files, the hierachial directories have to be rewritten every time the file or files are added to the disk. Unfortunately it is impossible to rewrite the directories previously written in the write-once disk, therefore, in such a case that the files are added on, it is difficult to keep the interchangeability with the CD-ROM.

SUMMARY OF THE INVENTION

An object of the invention is to provide a method for managing information on the write-once recording medium recorded in the same manner as described above.

In order to carry out the object in a preferred mode, the present invention provides a method for recording information intermittently on a write-once recording medium, said method comprising the steps of; providing on said recording medium a volume management area and a data area, recording an information and a management information for managing said information recorded, to said data area and said volume management area respectively, adding another information to said data area, renewing the management information for managing the information previously recorded and the information added as a whole and adding said renewed management information to said volume management area, and filling a non-recorded area between the last position of the management information added lastly and the start position of the data area with dummy data for making all of the recorded area contiguous.

BRIEF DESCRIPTION OF THE DRAWINGS

FIG. 1 is a flowchart illustrating a method for managing information of an information recording medium according to an embodiment of the invention;

DESCRIPTION OF THE PREFERRED EMBODIMENTS

Figure 4A:
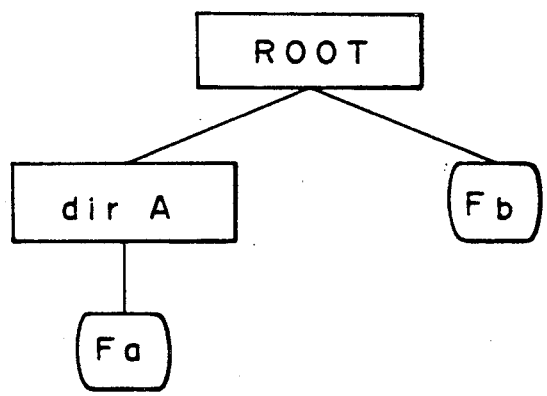
FIGS. 4A and 5A are views illustrating an example of a hierarchy structure.
Figure 5A:
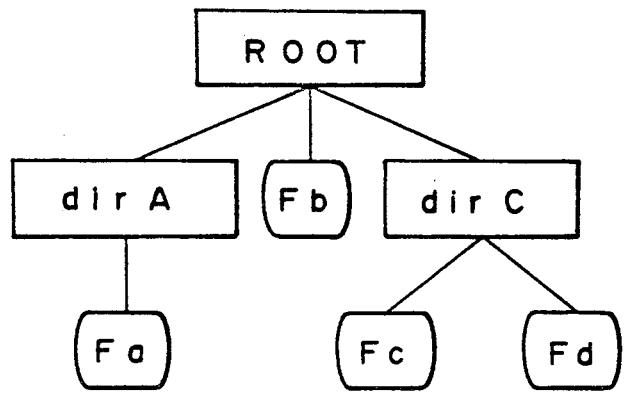
Figure 3:
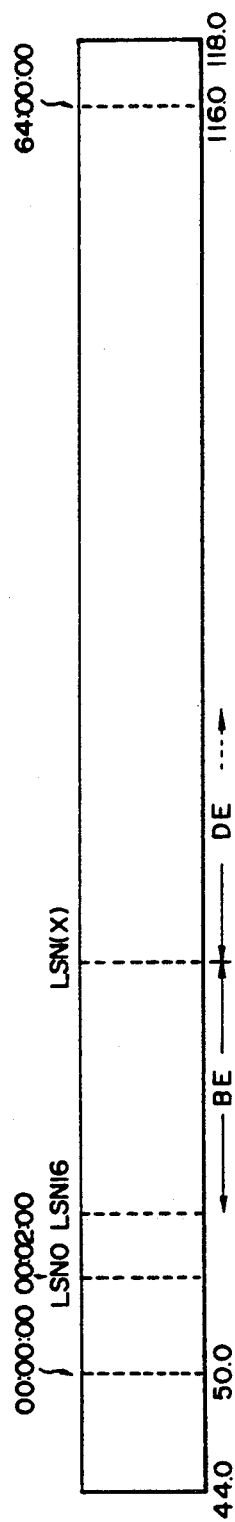
FIG. 3, 4B, 5B and 6 are views illustrating a logical format used in a write-once recording medium according to an embodiment of the invention.
Figure 4B:
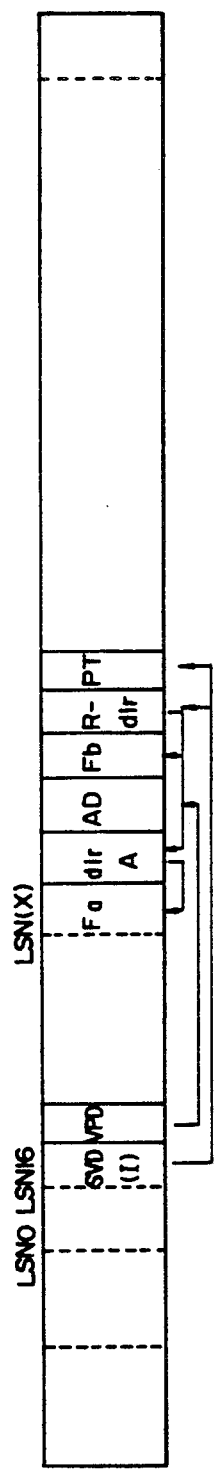
Figure 5B:
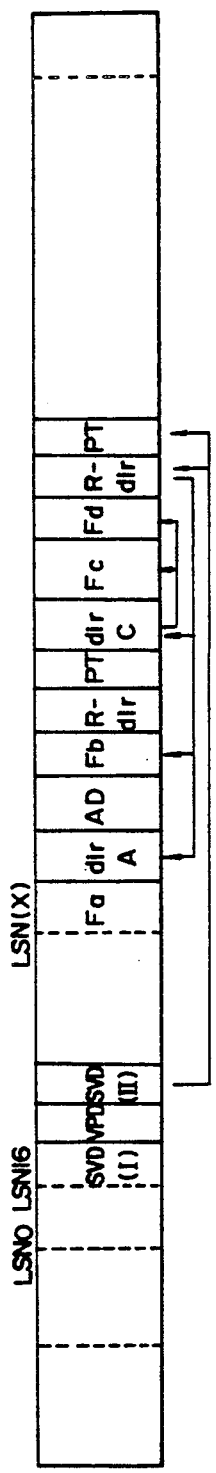

A description will be directed to an information recording medium and an information management method thereof designed according to an embodiment of the present invention. FIG. 1 is a flowchart illustrating the information management method of an information recording medium designed according to the invention, FIG. 2 is a block diagram showing a device for executing the information management method, FIGS. 3, 4B, and 5B are views illustrating a logical format used in an information recording medium according to an embodiment of the invention and FIGS. 4A and 5A are views illustrating an example of a hierarchy structure.

Figure 2:
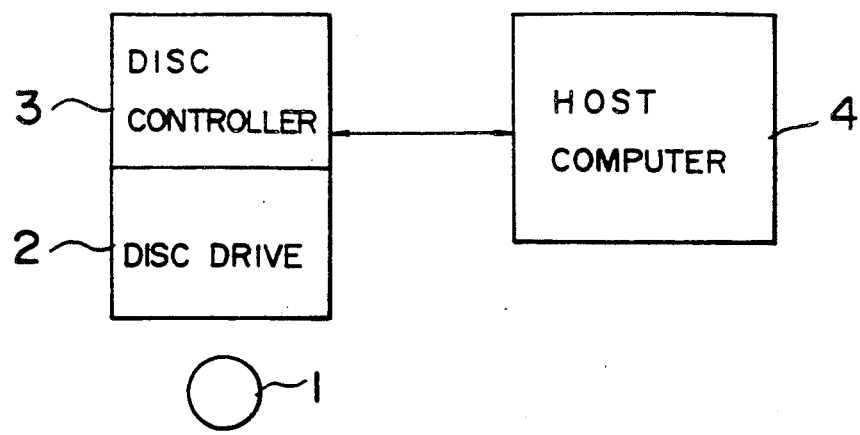
FIG. 2 is a block diagram showing a device for executing the information management method.

With reference to FIG. 2, 1 denotes a write-once disk medium (herein, taking an example of an optical disk). The optical disk 1 meets the well-known physical property of the CD and CD-ROM. And, on the optical disk 1, spiral pre-grooves modulated by a time code are formed. 2 denotes a disk drive to which the optical disk 1 is mounted. 3 denotes a disk controller for controlling the disk drive 2. The optical disk 1 mounted to the disk drive 2 is designed to receive the data written by the disk controller 3 in a manner to meet the physical format of the CD or CD-ROM.

4 denotes a host computer under the control of which the disk controller 3 is located. The host computer 4 serves to control the disk controller 3 along the flowchart (to be described later) so that the information is allowed to be recorded on the optical disk in accordance with a logical format as shown in FIGS. 4B, 5B and 6.

Next, the logical format will be described. FIG. 3 illustrates the spiral information area formed on the optical disk, which area is expanded with an axis of abscissa taken as a radial position. In FIG. 3, a lower index denotes a radial position by a [mm] unit and an upper index denotes a time code and a logical sector number when a starting point is placed at the radial position of 50.0 [mm] from the center of the disk.

The host computer 4 serves to write the information on the optical disk 1 so that a logical sector number LSN (Logical Sector Number) is set to have a header of a physical address (time code) 00:02:00 sector. The physical addresses LSN0 to LSN15 are empty areas for system-reserving areas. LSN16 to LSN(X-1) are volume disk group areas, that is, secured as a management information area BE. The LSN(X) position is defined several times predetermined by dividing the optical disk for recording the information on the divided sectors. The physical addresses on the after LSN(X) are reserved as a recording information area DE.

Figure 6:
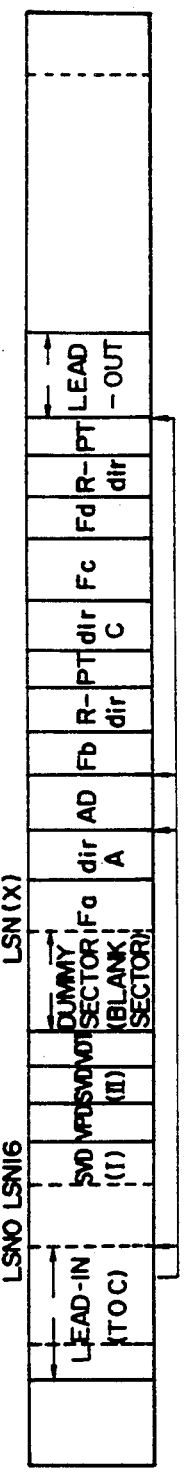

As shown in FIG. 3, after the management information area BE and the recording information area DE contiguous to the area BE are defined, the information is written on the areas in accordance with the logical format shown in FIGS. 4B, 5B and 6.

A file F (recording information), audio data AD (recording information), a directory dir (low-level management information), a root directory Rdir (basic management information), a path table PT (basic management information), and the like are written on the recording information area DE.

The file F means data itself. The audio data Ad means audio data itself. The directory dir (directory entry) means a title, a length and a position of a subdirectory located under the directory and a title, a length and a position of the file located under the directory. The root directory Rdir means a title, a length and a position of a subdirectory located under the root directory or the same of a file located under the root directory. The path table PT means a list indicating the head of the directory, concretely, the numbering positions of all the directories (logical sector numbers).

A supplement volume descriptor (index management information), a volume partition descriptor VPD and the like are written on the management information area BE.

The supplement volume descriptor SVD indicates a length and position of the root directory Rdir located in the recording information area and a length and a position of the path table PT located therein. The effective volume partition descriptor SVD is the latest time code (according to the ISO-9660/Hi-Sierra format).

The volume partition descriptor VPD indicates a length and a position of a divided area (area located out of the directory structure, for example, audio data) located in the recording information area. The effective volume partition descriptors VPD are all the written ones.

The volume descriptor terminator VDT indicates the end of a range of a volume descriptor group located in the management information area. The volume descriptor terminator VDT indicates the completion of the volume and stops writing the later data (according to the ISO-9660/Hi-Sierra format).

With reference to FIGS. 1, 3, 4A to 6, the description will be directed to the information management method and the logical format according to the invention.

As shown in FIG. 3, at first, the process takes a step of defining the management information area BE and the recording information area DE contiguous to the area BE (step 100).

Next, a file Fa and a file Fb being under the directory structure shown in FIG. 4A and audio data AD located in the divided area being out of the directory structure are written. And, the low-level management information of the directory A as a directory dir A, the basic management information located under the root directory root as a root directory R-dir, and a newly generated path table PT in the recording information area DE as shown in FIG. 4B are written respectively (step 101).

In next step, the root directory R-dir, a supplement volume descriptor SVD (I) representing the index management information of the path table PT, and a volume partition descriptor VPD representing the management information of audio data AD resident in the divided area are written (step 102). The arrows shown in FIG. 4B indicate the retrieval sequence of the host computer 4.

When the directory C, the file c and the file d being subject to the directory structure shown in FIG. 5A are added to the record described above, a step of adding to the recording information area DE and writing the management information dir C representing the newly added directory C, a new root directory R-dir and a path table PT which is generated from the changed root directory as the renewed management information, is carried out (step 101). Next, the supplement volume descriptor SVD (II) is written in the management information area BE (step 102). The supplement volume descriptor SVD means the basic management information indicating the new directory R-dir and the path table PT.

According to the invention, each time data is written on the optical disk 1, the supplement volume descriptor is changed and added to the disk and the volume partition descriptor VPD is added thereto. These volume descriptors (group) indexes the basic management information and manage the low-level hierarchy (directory, file) under the indexed basic management information (root directory, path table).

After completion of adding the files, the directories, the new supplement volume descriptor and the new volume partition descriptor caused by the addition of new information (step 103), the volume descriptor terminator VDT is written on the information management area (step 104). And, dummy sectors such as data 0 (Mode 0 in the CD-ROM) are written on blank sectors of the information management area, that is, between the volume descriptor terminator and the outset of the recording information area in a manner to occupy contiguous writing areas on the optical disk 1 (step 105). A lead-in section is written before the physical address (time code) 00:00:00 and a lead-out section is written after the recording information area. On the TOC located within the lead-in section, all of the time code representing, respectively a border position of each piece of information of the recording information area DE and a position of the lead-out section is written (step 106). The writing of them is accomplished according to the specifications described in the CD-ROM manual (Yellow book) published by Philips Company so that the optical disk 1 keeps compatibility with the read-only CD-ROM, thereby enabling the data to be reproduced in the normal CD-ROM player.

As described above, the present invention offers an information recording medium which can be reproduced by a read-only device such as a CD-ROM player.

When the information is reproduced in the optical disk recording and reproducing device, the invention is capable of tracing back the low-level management information based on the latest basic management information indexed by the latest added index for grasping the recording information. It results in stopping the drop of an efficiency for managing a file or a directory.

By tracing back the management information, it is possible to grasp the history about the writing of information on the write-once information recording medium. Hence, the recording information deleted on the basis of the management is allowed to be easily revived.

What is claimed is:

1. A method for recording information intermittently on an appendage type additional information recording medium to enable reproduction from said recording medium in a read only reproduction device, the method comprising the steps of:

providing on said recording medium a volume management area and a data area;

recording data information to the data area and recording management information to the volume management area, said management information for managing the data information recorded on said recording medium;

recording additional data information to the data area;

renewing the management information for managing the data information previously recorded to generate updated management information for managing the data information and writing the updated management information to the volume management area; and filling with dummy data a non-recorded area on said recording medium between a last position of the updated management information and a start position of the data area for making the volume management area and the data area immediately adjacent;

writing a descriptor terminator in the volume management area representing the termination of the volume management area.

* * * * *